United States Patent
Peake et al.

(10) Patent No.: US 12,513,079 B1
(45) Date of Patent: Dec. 30, 2025

(54) FAILSAFE LOOP DETECTION IN ETHERNET NETWORKS

(71) Applicant: Amazon Technologies, Inc., Seattle, WA (US)

(72) Inventors: Burton Tracy Peake, Nashville, TN (US); David Joshua Ambriz, Leander, TX (US); Engdawork Bogale Gebre, Round Rock, TX (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 371 days.

(21) Appl. No.: 18/122,444

(22) Filed: Mar. 16, 2023

(51) Int. Cl.
*H04L 45/18* (2022.01)
*H04L 45/48* (2022.01)

(52) U.S. Cl.
CPC .............. *H04L 45/18* (2013.01); *H04L 45/48* (2013.01)

(58) Field of Classification Search
CPC ..... H04L 1/1642; H04L 47/34; H04L 1/1607; H04L 45/48; H04L 49/351; H04L 12/462; H04L 45/00; H04L 49/253; H04L 12/4645; H04L 45/484; H04L 45/50; H04L 45/54; H04L 47/10; H04L 47/122; H04L 12/42; H04L 12/46; H04L 12/4641; H04L 41/12; H04L 45/02; H04L 45/04; H04L 45/22; H04L 45/24; H04L 45/28; H04L 45/64; H04L 45/66; H04L 47/2408; H04L 49/101; H04L 49/1515; H04L 49/205; H04L 49/254; H04L 49/3018; H04L 49/3045; H04L 49/354; H04L 49/506; H04L 67/10; H04L 1/22; H04L 12/18; H04L 12/413; H04L 12/4625; H04L 12/4637; H04L 12/56; H04L 12/5601; H04L 12/5602; H04L 2101/622; H04L 41/0654; H04L 41/082; H04L 41/0823; H04L 45/125; H04L 45/16; H04L 45/18; H04L 45/245; H04L 45/30; H04L 45/488; H04L 45/563; H04L 45/68; H04L 45/72; H04L 45/74; H04L 45/742; H04L 45/745; H04L 45/7452; H04L 45/76; H04L 47/11; H04L 47/125; H04L 47/2433; H04L 47/2441;
(Continued)

(56) References Cited

U.S. PATENT DOCUMENTS

| | | | | |
|---|---|---|---|---|
| 5,430,728 | A * | 7/1995 | Narayanan | H04L 45/04 370/404 |
| 6,735,679 | B1 * | 5/2004 | Herbst | H04L 49/103 711/167 |
| 8,874,477 | B2 * | 10/2014 | Hoffberg | G06Q 20/065 705/37 |
| 2004/0160904 | A1 * | 8/2004 | Enomoto | H04L 45/00 370/256 |

(Continued)

*Primary Examiner* — Nathan S Taylor
(74) *Attorney, Agent, or Firm* — K&L Gates LLP

(57) ABSTRACT

Devices and techniques are generally described for loop detection failsafe in Ethernet networks. In some examples, a first set of networked devices employing a loop-prevention protocol may be determined. A first device of the first set of networked devices may be identified. The first device may include at least a first port and a second port. In some examples, it may be determined that the loop-prevention protocol has assigned a forwarding state to the first port. It may be determined that an application of the loop-prevention protocol assigns a non-forwarding state to the second port. In some examples, a determination may be made that the second port forwards network traffic. In various examples, a network link associated with the second port may be disabled.

20 Claims, 5 Drawing Sheets

(58) Field of Classification Search
CPC . H04L 47/2458; H04L 47/2491; H04L 47/31; H04L 47/32; H04L 47/50; H04L 47/56; H04L 47/6215; H04L 47/623; H04L 47/745; H04L 47/827; H04L 49/102; H04L 49/103; H04L 49/109; H04L 49/15; H04L 49/25; H04L 49/3072; H04L 49/3081; H04L 49/309; H04L 49/352; H04L 49/45; H04L 49/50; H04L 49/501; H04L 49/505; H04L 49/555; H04L 49/606; H04L 49/90; H04L 49/901; H04L 49/9047; H04L 49/9063; H04L 49/9073; H04L 49/9094; H04L 61/2596; H04L 67/535; H04L 69/14; H04L 69/16; H04L 69/161; H04L 69/323; H04L 69/329; H04L 69/40; H04L 9/40; H04L 12/28; H04L 1/00; H04W 28/06; H04W 28/082; H04W 28/0865; H04W 28/09; H04W 76/15; H04W 88/06; H04W 16/28; H04W 64/003; H04W 72/541; H04W 84/18; G06F 8/65; G06F 11/00; G06F 9/50; G06Q 10/0631; G06Q 10/0635; G06Q 10/06375; G06Q 10/103; G06Q 20/065; G06Q 20/22; G06Q 20/40; G06Q 30/0201; G06Q 30/08; G06Q 40/00; G06Q 40/04; G06Q 50/188; H04Q 11/0478; H04Q 2011/0081; H04Q 2213/167; H04Q 3/0079; G08C 15/00; H04J 1/16; H04J 3/14

See application file for complete search history.

(56) References Cited

U.S. PATENT DOCUMENTS

| | | | |
|---|---|---|---|
| 2005/0138008 A1* | 6/2005 | Tsillas | H04L 45/50 |
| 2005/0152289 A1* | 7/2005 | Nagata | H04L 45/48 370/256 |
| 2005/0220096 A1* | 10/2005 | Friskney | H04L 12/4645 370/389 |
| 2006/0002370 A1* | 1/2006 | Rabie | H04L 47/32 370/389 |
| 2006/0203735 A1* | 9/2006 | Takatori | H04L 12/462 370/242 |
| 2008/0130655 A1* | 6/2008 | Herbst | H04L 49/352 370/395.7 |
| 2008/0279196 A1* | 11/2008 | Friskney | H04L 45/64 370/400 |
| 2009/0063679 A1* | 3/2009 | Nakao | H04L 47/10 709/224 |
| 2009/0268746 A1* | 10/2009 | Ogasahara | H04L 12/42 370/406 |
| 2010/0182937 A1* | 7/2010 | Bellagamba | H04L 45/18 370/256 |
| 2011/0085567 A1* | 4/2011 | Beecroft | H04L 49/3045 370/412 |
| 2011/0090797 A1* | 4/2011 | Beecroft | H04L 45/125 370/237 |
| 2014/0153443 A1* | 6/2014 | Carter | H04L 45/48 370/256 |
| 2014/0169173 A1* | 6/2014 | Naouri | H04L 49/351 370/237 |
| 2016/0094620 A1* | 3/2016 | Darling | H04L 67/535 709/204 |
| 2017/0054604 A1* | 2/2017 | Wakumoto | H04L 12/462 |
| 2022/0131799 A1* | 4/2022 | Zheng | H04L 45/745 |
| 2024/0015100 A1* | 1/2024 | Jain | H04L 12/462 |

* cited by examiner

FAILSAFE LOOP DETECTION IN ETHERNET NETWORKS

BACKGROUND

Computer network topologies include an arrangement of devices, such as compute nodes, switches, bridges, routers, and/or other devices configured in communication with one another via one or more communications links. Communications links provide the communication channel that allows for communication between two communicating devices. Links may be physical links (e.g., Ethernet cables, optical cables, copper wiring, etc.) or may be logical links employing one or more underlying physical links.

DETAILED DESCRIPTION

Figure 1:
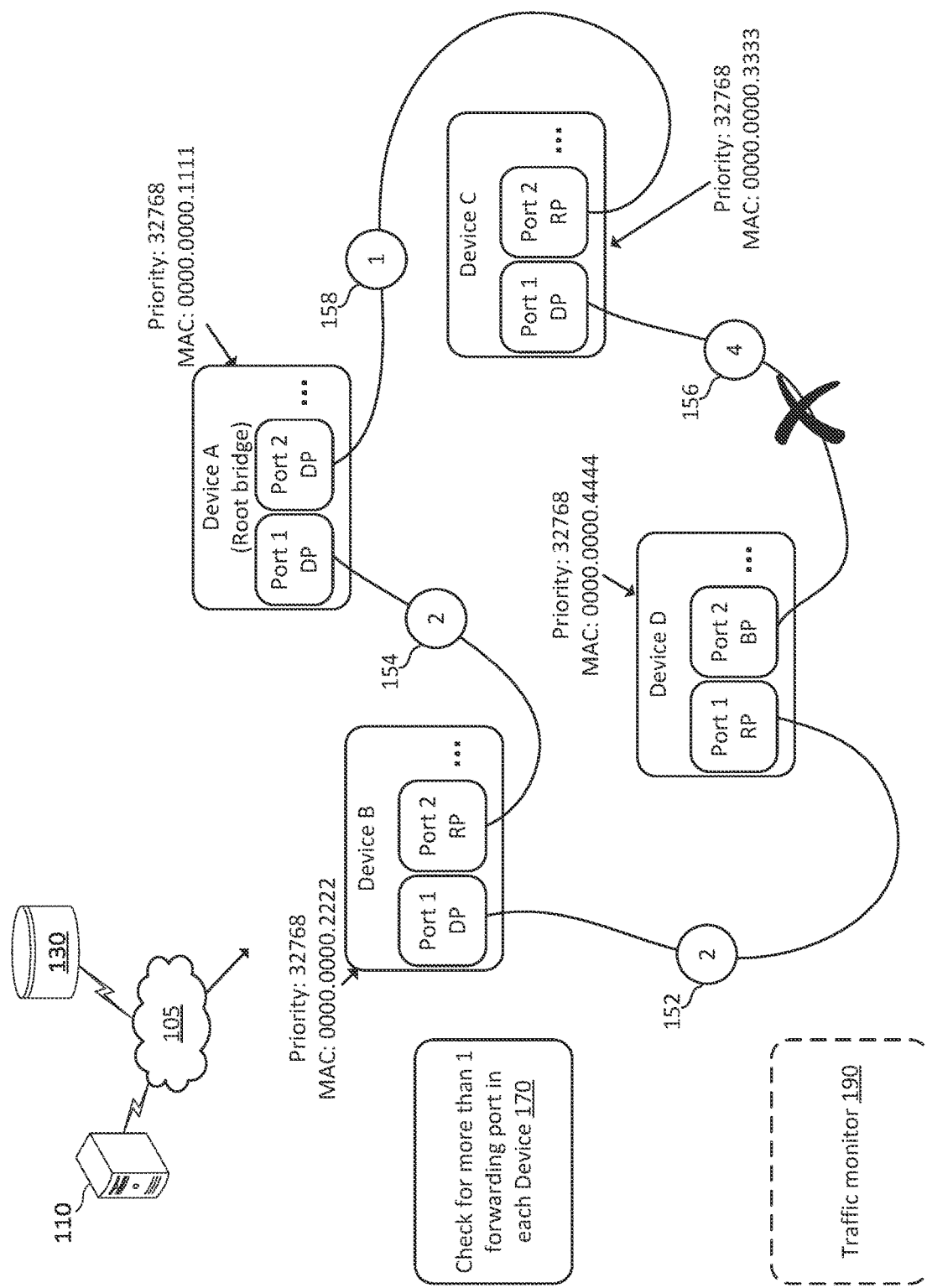
FIG. 1 is a diagram of an example network topology that may be monitored using the failsafe loop detection techniques described in the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Modern computer communication networks are large, complex, and designed for robustness to failure. Such robustness is often achieved using redundancy in network design to minimize the impact of the failure of any individual component. Ethernet networks refer to wired computing networks (or logical overlays for underlying physical networks) used for communication between different computing devices. Examples may include local area networks (LANs) and/or virtual local area networks (VLANs). Often, in Ethernet networks, frames (e.g., digital data transmission units) may not be associated with time-to-live (TTL) values and may thus persist in a network until such frames are received and are not forwarded by the receiving device. A network loop occurs when there is more than one Layer 2 Open Systems Interconnection (OSI) path between two endpoints or two ports on the same device that are connected to one another. If a receiving device forwards the frame back to the originating device, which, in turn, forwards the frame back to the original recipient, a loop can be created. Layer 2 frame headers do not support TTL values, and thus such loops are a concern in Ethernet network topology design. Over time, such loops can flood the network with traffic resulting in network slowdowns and even failure.

As such, various loop-prevention protocols (sometimes referred to as loop avoidance protocols) may be used to avoid network loops. For example, spanning tree protocol (STP) is an example of a loop-prevention protocol used to prevent looping within a network topology. STP attempts to avoid flooding the network with packets/frames that are continually forwarded in perpetuity in networks that have redundant paths.

Networks are configured with redundant paths to mitigate risks associated with path failure. For example, if there are multiple paths between node A and node B in a network and a first path fails, network traffic between node A and B can be re-routed to a different path to avoid failure. Without loop-prevention protocols, it is difficult to provide path redundancy without causing unwanted network loops. STP, for example, identifies redundant connections and selectively disables (e.g., "blocks") certain ports to avoid loops. STP is described in further detail below. The various techniques described herein may be used with any desired loop-prevention protocol (e.g., STP, Extreme Loop Recovery Protocol (ELRP), etc.) according to the desired implementation.

LANs (including VLANs) are often divided into network segments. Bridge devices may be used to communicatively couple individual network segments. Frames are received by bridge devices before being sent to an intended destination. The bridge determines whether the frame is for a destination within bridge device's network segment or for another network segment and forwards the frame accordingly. When used in the context of STP, a bridge device can also be a network switch. Additionally, in a virtual network, a grouping of ports may not be on the same physical device. However, as used herein a "device" may refer to a grouping of ports whether on the same physical device (e.g., a switch or bridge) or on a virtual device (e.g., a logical grouping of network ports).

A bridge examines the destination address of a frame, and, based on the network topology map (e.g., the map designating which devices belong to which network segments), forwards the frame on the correct network path via the correct outgoing port. Network segmentation and bridging can reduce the amount of congestion on a given network path.

A segmented LAN is often designed with redundant bridges and paths to ensure that communications can continue in the event that a network link becomes unavailable. Accordingly, redundancy in a network makes the network fault tolerant. However, as described above, redundant paths make the network susceptible to looping. Accordingly, loop-prevention protocols such as STP are used to avoid looping while maintaining network path redundancy.

When STP is enabled, each bridge determines which devices are on which network segment by sending a first-time message to network segments. Through this process, the bridge discovers the devices' locations and records the details in memory (e.g., in a table). When subsequent messages are sent, the bridge uses the table (e.g., a routing table) to determine the appropriate network segment.

In a network that contains redundant paths, bridges may continually monitor the network topology to control the flow of traffic and prevent looping. To do this, bridges exchange bridge protocol data units (BPDUs) via an extended LAN that uses STP. BPDUs are data messages that provide the bridges with network information used to carry out STP operations.

STP executes the spanning tree algorithm on each STP-enabled bridge. The spanning tree algorithm is designed to avoid bridge loops when redundant paths exist. It uses the BPDUs to identify redundant links and to select the best data path for forwarding messages. As described in further detail below, STP also controls packet forwarding by setting the port state on each device (grouping). Port states set by STP may be referred to herein as STP states.

However, in some cases, spanning tree misconfigurations, hardware parity errors, software bugs, Layer-1 failures, and/or other loop-prevention protocol errors may result in a looping condition in a network. In some cases, (e.g., in the case of hardware parity errors) the looping condition may exist even when the loop-prevention protocol instructs the device hardware to block a particular port. For example, a bit may be flipped in hardware that causes a port that should be blocked on a device (according to the loop-prevention protocol) to forward network traffic-creating a network loop. Described herein is a loop-detection failsafe process that may detect such network loops even where the loop results from memory parity and/or other hardware parity errors. Additionally, when a loop is detected, the various techniques described herein may disable links at a Layer-1 level such that the looping condition is remediated even in the face of hardware parity errors.

FIG. 1 is a diagram of an example network topology that may be monitored using the failsafe loop detection techniques described in the present disclosure. Various examples using STP are described in reference to FIG. 1 as an example of a loop-prevention technique. However, it should be noted that any desired loop-prevention protocol may be used in accordance with the failsafe loop detection techniques described herein.

There are four devices—Devices A, B, C, and D in the example network topology depicted in FIG. 1. It should be noted that this is a relatively simplistic example and that any number of devices may be used in accordance with the various techniques described herein. Devices A, B, C, and D may be physical devices (e.g., bridges, switches, etc.) or may be virtual devices (e.g., logical groupings of various network ports and/or devices). The devices may exchange BPDUs to determine information used by STP. Each device may be associated with a bridge ID which may be a combination of the bridge priority and the base MAC address for the device. In the example in FIG. 1, each device's bridge ID is set to the default value of 32,768.

Devices A, B, C, and D are connected using links between different ports (as shown in FIG. 1). Each link is associated with a cost (e.g., cost 152, 154, 156, and 158) representing a cost of transmission on that link. In general the higher the bandwidth on a link, the lower the cost. Accordingly, the cost may represent a cost to transmit data over that link, with lower costs being better in terms of overall network performance. There are redundant links among the interconnected devices A, B, C, and D. For example, from Device D to Device A, there are two possible paths: DBA and DCA. These redundant links can potentially create an unwanted network loop, absent proper STP functionality.

After exchanging BPDUs, STP selects one device among the spanning tree instance (e.g., the set of devices and/or virtual devices being considered using STP (e.g., among Devices A, B, C, and D in the current example)) as the root bridge. The lowest bridge ID determines the root bridge. In this example, since all priorities are the same, the lowest MAC address is selected. Accordingly, Device A with a MAC address of 0000.0000.1111 is selected as the root bridge. After election of the root bridge in the spanning tree instance, all other devices (Devices B, C, and D) are considered non-root bridges. Next, STP determines, for each other switch (Devices B, C, and D) the path to the root bridge associated with the lowest cost. For example, for Device B, there are two paths to the root bridge (Device A): BA and BDCA. Path BA has a cost 154 of 2, while path BDCA's cost is determined by adding the individual link costs (e.g., by adding cost 152, 156, and 158: 2+4+1=7). Since 2<7, path BA is associated with a lower cost and is selected. The port on Device B that is connected to path BA is therefore designated by STP as a root port (RP in FIG. 1). Root ports therefore represent the port with the lowest-cost path to the root bridge. The other end of this path (e.g., Port 1 on Device A) is selected as a designated port (DP in FIG. 1).

Similarly, from Device C to the root bridge (Device A) there are two paths: CA and CDBA. CA has a cost of 1 and CDBA has a cost of 4+2+2=8. Accordingly, port 2 of Device C is selected as the root port. The other end of this path (Port 2 on Device A) is selected as a designated port.

For Device D, there are two path to the root bridge (Device A): DBA and DCA. DBA has a cost of 2+2=4 and DCA has a cost of 4+1=5. Therefore, Port 1 of Device D, which is connected to the lowest-cost path DBA is selected as the root port. The other end of this link (Port 1 on Device B) is selected as a designated port (DP). According to STP, a non-root bridge (e.g., Devices B, C, D) can have any number of designated ports, but may only have one root port. All ports of the root bridge (Device A) are designated ports. The root bridge has no root port.

After evaluation of Device D, the lowest-cost path to the root bridge from all devices (e.g., from all non-root bridge Devices B, C, D) has been determined. Accordingly, the link between Device D and Device C is blocked by STP in order to eliminate a loop. This is represented by an X over the DC link in FIG. 1. On the blocked link DC, one port should be selected as a designated port and the other end should be put in a blocking state (indicating that it should not forward network traffic). STP selects the port with the lower bridge ID as the designated port and the other port as the blocking port. In this example, the bridge ID of Device C is lower than the bridge ID of Device D (as the MAC address of Device C is lower than that of Device D and their priorities are the same). Accordingly, Port 1 of Device C is selected as the designated port, while the other end of the link DC (Port 2 of Device D) is selected as the blocking port (BP). The blocking port will not forward or send any frames, it merely drops frames. Accordingly, STP ensures that no more than one port on any given device (or virtual device) in the spanning tree instance is forwarding frames toward the root bridge.

However, in some cases, although STP may assign a blocking state (or other non-forwarding state) to a non-root port on a particular device a hardware parity error may cause the port to forward network traffic and create a network loop. For example, in FIG. 1, although Port 2 of Device D has been assigned as a blocking port (having a blocking state) a hardware parity error may cause Port 2 of Device D to forward network traffic creating a looping condition in the network. Over time, as network traffic accumulates, the loop may cause network slowdown and/or a network outage. Accordingly, block 170 represents a monitoring process by which a system may check to see whether there is more than one forwarding port in each device. Upon determining that more than one port on a particular device (e.g., a physical switch, a logical collection of ports, etc.) is forwarding traffic, the link that is connected to one of the forwarding ports may be disabled. Note that this link may be disabled at Layer-1 (e.g., by removing power from the link) thereby avoiding further hardware parity error concerns and eliminating the loop. Examples of such a process are described in further detail below.

In various examples, the monitoring process from block 170 may be executed on one or more of the switches/bridges of the network segment (e.g., the spanning tree instance). However, in various other examples, the monitoring process from block 170 may be executed on one or more separate devices (e.g., computing device(s) 110) that communicate out-of-band with respect to the monitored network segment (e.g., on a management port). In various examples, it may be advantageous to execute the monitoring process from block 170 on an out-of-band device such as computing device(s) 110 so that network outage/slowdown resulting from a possible network loop does not affect the device's ability to detect and/or remediate the network loop. In various examples, the computer-executable instructions used to perform the monitoring process at block 170 and/or to disable a link in response to loop detection may be stored in one or more non-transitory computer-readable memories 130. Network 105 may represent a larger network of which the network segment (e.g., the spanning tree instance) that includes Devices A, B, C, and D is one network segment. Upon detection of a loop and/or disabling of a network link to eliminate a loop, the monitoring process executed at block 170 may generate output data (e.g., an alert) indicating that an unstable network condition occurred. The output data may indicate the pertinent switch (or other port grouping) and/or disabled link so that remedial action may be taken (e.g., by a network administrator) during the next scheduled maintenance window (to avoid network downtime).

Figure 2:
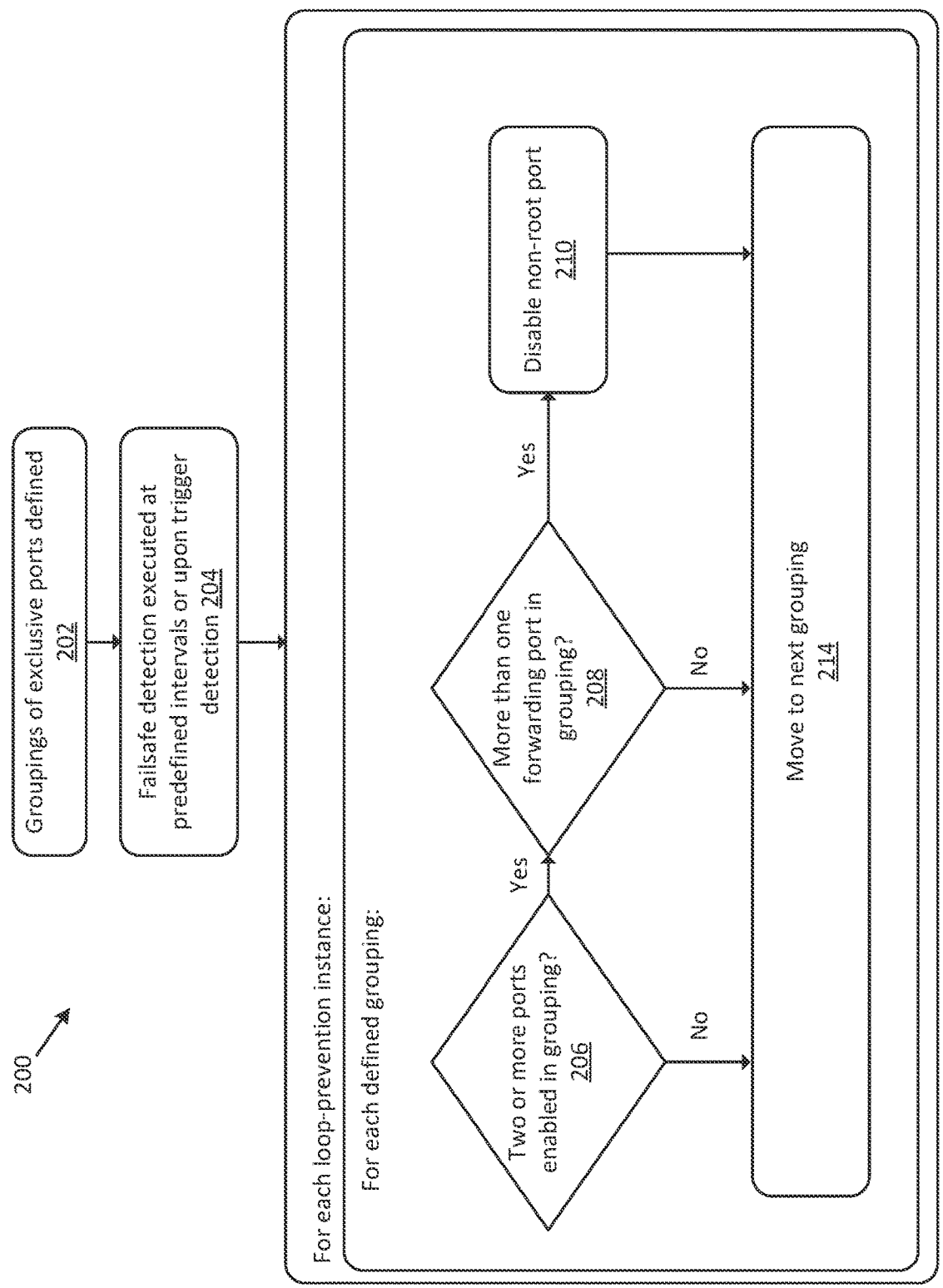
FIG. 2 is an example process for failsafe loop detection in Ethernet networks, according to various embodiments of the present disclosure.

FIG. 2 is an example process for failsafe loop detection in Ethernet networks, according to various embodiments of the present disclosure. Those portions of FIG. 2 that have been previously discussed in reference to FIG. 1 may not be described again for purposes of clarity and brevity. The actions of the process 200 may represent a series of instructions comprising computer-readable machine code executable by one or more processing units (e.g., CPUs, GPUs, tensor processors, etc.) of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the various techniques described herein.

In various examples, at action 202, groupings of exclusive ports are defined. For example, the network topology and/or the loop-prevention protocol (such as STP, described above) may define groupings of ports per network segment. The ports may be assigned various states such as designated ports, root ports, and/or blocking ports as described above. Root ports forward traffic toward the root bridge, while designated ports forward traffic away from the root bridge (e.g., designated ports forward traffic onto a given destination network segment).

The monitoring process (e.g., from block 170 of FIG. 1) may be executed at predefined intervals and/or may be triggered upon detection of network traffic being detected as being forwarded out of a port assigned as a non-forwarding port by the loop-prevention protocol (block 204). For example, the failsafe monitoring process may be executed at predefined time intervals or check to see if the device (e.g., a switch) reports having multiple ports in a forwarding state.

In another option, a check may be performed (e.g., by an optional traffic monitor 190) to determine the amount of data being sent over a link. If a link that is connected to a blocked port has more than a threshold amount of traffic (e.g., as reported by a traffic monitor reporting a counter state indicating an amount of network traffic over a link) the monitoring process may be triggered.

The following actions of FIG. 2 may be performed for each loop-prevention instance (e.g., for each network segment) and then, within each loop-prevention instance for each defined grouping of ports (e.g., for each device or virtual device). At action 206, a determination may be made whether two or more ports are enabled in a particular grouping (e.g., in a single physical or virtual device). If not, there can be no loop created by this device/grouping. Accordingly, processing may proceed to action 214 at which the monitoring process may proceed to the next grouping. If two or more ports are enabled for the grouping being evaluated at action 206, processing may proceed to action 208, at which a determination may be made of whether more than one port is in a forwarding state in the grouping. In other words, a determination may be made whether there is more than one port that has a forwarding path leading to the root bridge (or an equivalent device or virtual device in non-STP-based loop prevention protocols). This determination may be made by monitoring the links (e.g., with a counter) associated with each enabled port, and/or by receiving the port state reported from the device's software and/or from a loop-prevention protocol (e.g., STP). If there is only one forwarding port in the grouping, processing may proceed to action 214 at which the monitoring process may proceed to the next grouping. If more than one port is in a forwarding state, processing may proceed to action 210 and the non-root port may be disabled to eliminate a loop in the network. In various examples, the link may be disabled at Layer-1 (e.g., by removing power to the link) to ensure that any hardware parity error does not result in the persistence of the loop.

Figure 3:
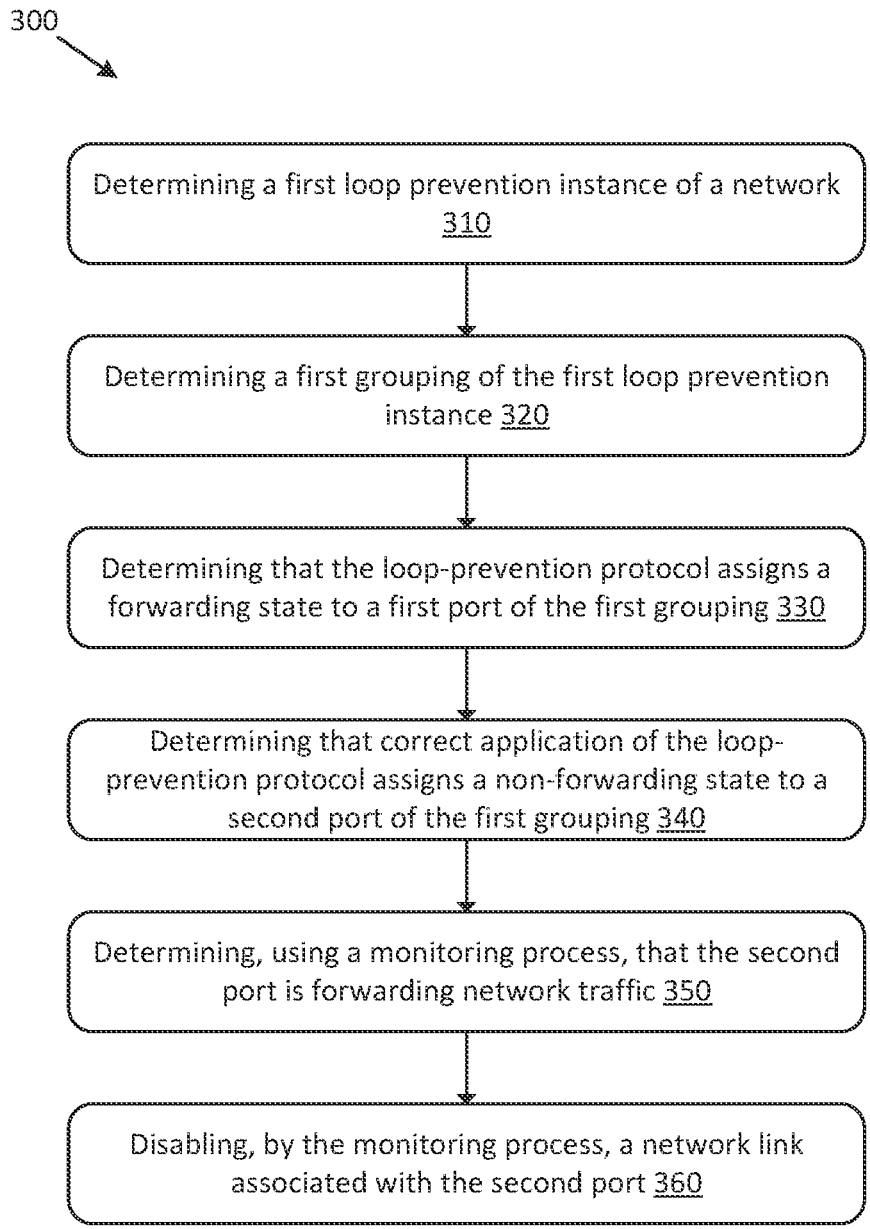
FIG. 3 is flow chart describing another example process that may be used for failsafe loop detection, according to various embodiments of the present disclosure.

FIG. 3 is flow chart describing an example process 300 that may be used for failsafe loop detection, according to various embodiments of the present disclosure. Those portions of FIG. 3 that have been previously discussed in reference to FIGS. 1 and 2 may not be described again for purposes of clarity and brevity. The actions of the process 300 may represent a series of instructions comprising computer-readable machine code executable by one or more processing units (e.g., CPUs, GPUs, tensor processors, etc.) of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the various techniques described herein.

Processing may begin at action 310, at which a first loop prevention instance of a network may be determined. A first loop prevention instance may refer to a first network segment on which a Layer-2 (or other OSI model layer) loop-prevention protocol is executing. Processing may continue to action 320, at which a first grouping of the first loop prevention instance may be determined. A first grouping may refer to a first switch having one or more ports, a bridge having one or more ports, another computing device having one or more ports, a logical grouping of ports executing on different physical devices in a VLAN, etc.

Processing may continue at action 330, at which a determination may be made that the loop-prevention protocol assigns a forwarding state to a first port of the first grouping. For example, a first port of the first grouping may be assigned as a root port configured to forward frames and/or other network traffic to the root bridge.

Processing may continue at action 340, at which a determination may be made that correct application of the loop-prevention protocol assigns a non-forwarding state to a second port of the first grouping. However, due to some error or malfunction, the loop-prevention protocol may assign a forwarding (non-blocking) state to the second port of the first grouping. In some examples, the loop-prevention protocol may generate data indicating that the second port is in a forwarding state, correctly reflecting the actual state of the second port (even though proper application of the loop-prevention protocol should result in the second port being in a non-forwarding state). In other examples, the loop-prevention protocol may generate data indicating that the second port is in a non-forwarding state (i.e., the correct output state for the second port that should be provided by the loop-prevention protocol absent some parity error or other error) even though the second port is, in fact, forwarding traffic (e.g., due to a hardware parity error). For example, the second port may be assigned as a blocking port by the loop-prevention protocol that is configured to drop packets to prevent a network loop.

Processing may continue at action 350, at which a determination may be made, using a monitoring process (e.g., the failsafe loop detection techniques described herein), that the second port is forwarding network traffic. For example, although the loop-prevention protocol (e.g., STP) should have assigned the second port as a non-forwarding port (e.g., a blocking port), the second port may be detected as nonetheless forwarding traffic. This may be due to environmental conditions (e.g., a solar flare), a software bug, and/or some other error. For example, the loop-prevention protocol may send instructions to a control register and/or a control bit to assign the second port as a blocking port. However, the bit may be flipped (e.g., a hardware parity error) resulting in the second port being assigned as a forwarding port. The determination at action 350 may be made either by software on the switch (or other device of the grouping) reporting that the second port is forwarding and/or by monitoring network traffic on the link connected to the second port to determine that network traffic is being sent over the link.

Processing may continue at action 360, at which the monitoring process may disable the network link associated with the second port. For example, upon determining that the non-forwarding port is forwarding traffic, the monitoring process may disable the network link that is coupled to the second port (e.g., at Layer-1 by removing power from the link). Although removing the link may decrease network redundancy, the removal of the link may eliminate the network loop and thus prevent network slowdown and/or a crash. In various examples, upon disabling the link, an alert may be sent by the monitoring process to a network administrator. The alert may specify the port and/or device and may indicate that the port was forwarding traffic despite being assigned as a non-forwarding port by the loop-prevention protocol. The alert may indicate that the link was removed. Accordingly, during the next scheduled maintenance window, the network administrator may reboot the device to see if the hardware parity error (or other error) persists. If not, the link may be re-instated, increasing the redundancy in the network.

Figure 4:
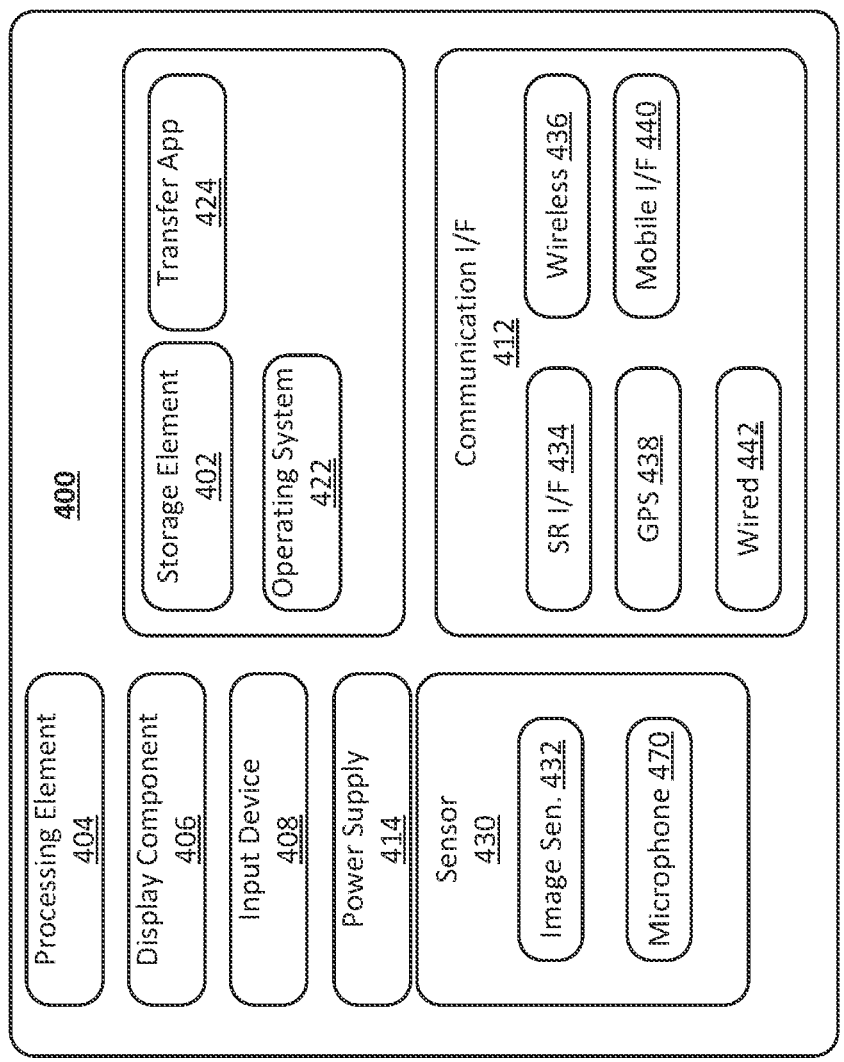
FIG. 4 is a block diagram showing an example architecture of a computing device that may be used in accordance with various embodiments described herein.

FIG. 4 is a block diagram showing an example architecture 400 of a computing device that may be used to perform failsafe loop detection, in accordance with various aspects of the present disclosure. For example, the architecture 400 may be an example architecture of a switch, bridge, or other computing device (e.g., computing device 110) that is configured to executed all or part of the monitoring process used as a failsafe for loop detection in Ethernet networks, as described herein. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. In various examples, audio captured by microphone 470 may be streamed to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as the network 105, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s), as described herein, are exemplary, and may be located as a stand-alone device or may be included, in whole or in part, as a component of a larger device or system.

Figure 5:
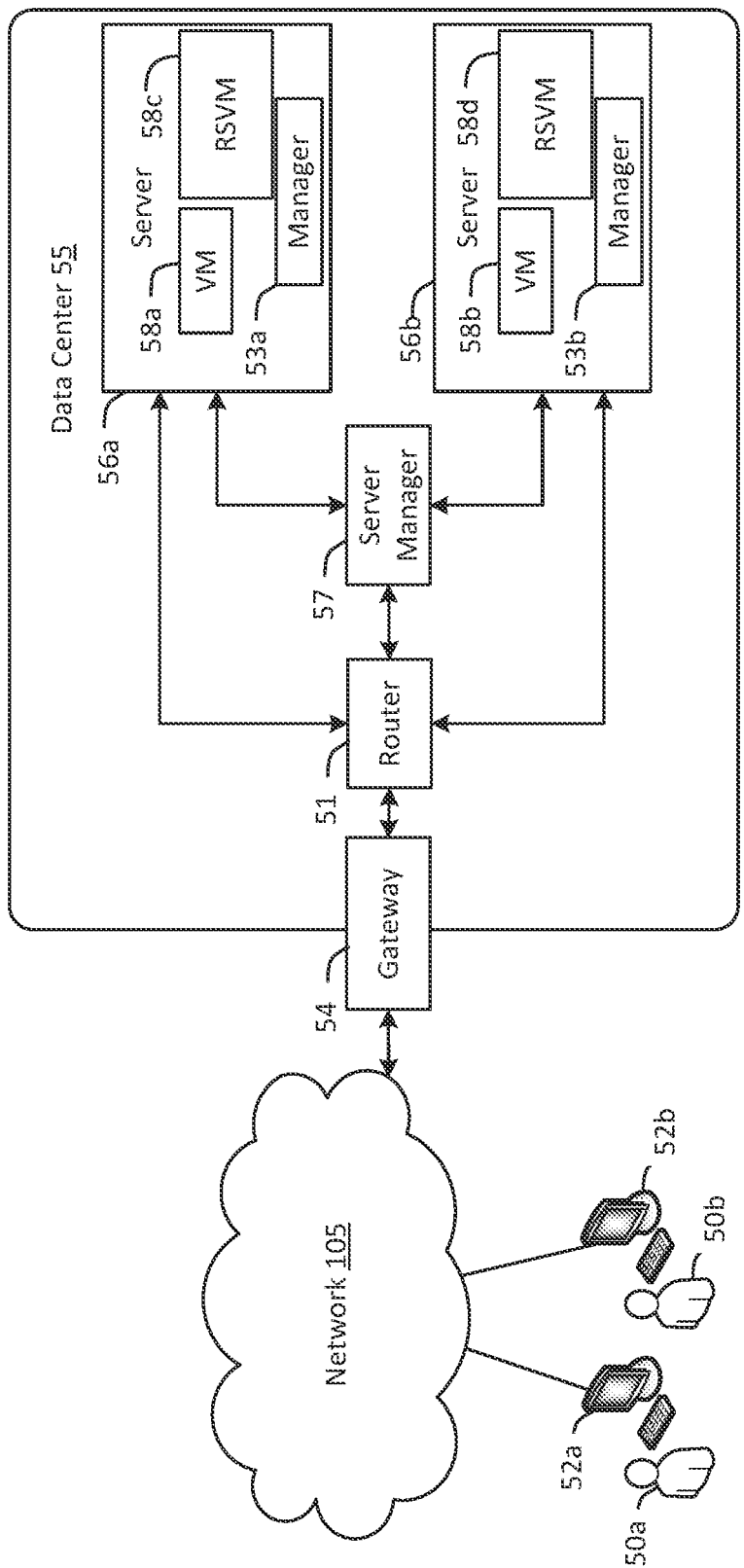
FIG. 5 is a diagram illustrating an example system for sending and providing data that may be used in accordance with the present disclosure.

An example system for sending and providing data will now be described in detail. In particular, FIG. 5 illustrates an example computing environment in which the embodiments described herein may be implemented. For example, the computing environment of FIG. 5 may be an example of a computing environment that may be monitored for loop detection, as described herein. FIG. 5 is a diagram schematically illustrating an example of a data center 55 that can provide computing resources to users 50a and 50b (which may be referred herein singularly as user 50 or in the plural as users 50) via user computers 52a and 52b (which may be referred herein singularly as user computer 52 or in the plural as user computers 52) via network 105. Data center 55 may be configured to provide computing resources for executing applications on a permanent or an as-needed basis. The computing resources provided by data center 55 may include various types of resources, such as gateway resources, load balancing resources, routing resources, networking resources, computing resources, volatile and nonvolatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 55 may include servers 56a and 56b (which may be referred herein singularly as server 56 or in the plural as servers 56) that provide computing resources. These resources may be available as bare metal resources or as virtual machine instances 58a-d (which may be referred herein singularly as virtual machine instance 58 or in the plural as virtual machine instances 58). In at least some examples, server manager 57 may control operation of and/or maintain servers 56. Virtual machine instances 58c and 58d are rendition switching virtual machine ("RSVM") instances. The RSVM virtual machine instances 58c and 58d may be configured to perform all, or any portion, of the techniques for improved rendition switching and/or any other of the disclosed techniques in accordance with the present disclosure and described in detail above. As should be appreciated, while the particular example illustrated in FIG. 5 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 5, network 105 may, for example, be a publicly accessible network of linked networks and possibly operated by various distinct parties, such as the Internet. In other embodiments, network 105 may be a private network, such as a corporate or university network that is wholly or partially inaccessible to non-privileged users. In still other embodiments, network 105 may include one or more private networks with access to and/or from the Internet.

Network 105 may provide access to user computers 52. User computers 52 may be computers utilized by users 50 or other customers of data center 55. For instance, user computer 52a or 52b may be a server, a desktop or laptop personal computer, a tablet computer, a wireless telephone, a personal digital assistant (PDA), an e-book reader, a game console, a set-top box or any other computing device capable of accessing data center 55. User computer 52a or 52b may connect directly to the Internet (e.g., via a cable modem or a Digital Subscriber Line (DSL)). Although only two user computers 52a and 52b are depicted, it should be appreciated that there may be multiple user computers.

User computers 52 may also be utilized to configure aspects of the computing resources provided by data center 55. In this regard, data center 55 might provide a gateway or web interface through which aspects of its operation may be configured through the use of a web browser application program executing on user computer 52. Alternately, a stand-alone application program executing on user computer 52 might access an application programming interface (API) exposed by data center 55 for performing the configuration operations. Other mechanisms for configuring the operation of various web services available at data center 55 might also be utilized.

Servers 56 shown in FIG. 5 may be servers configured appropriately for providing the computing resources described above and may provide computing resources for executing one or more web services and/or applications. In one embodiment, the computing resources may be virtual machine instances 58. In the example of virtual machine instances, each of the servers 56 may be configured to execute an instance manager 53a or 53b (which may be referred herein singularly as instance manager 53 or in the plural as instance managers 53) capable of executing the virtual machine instances 58. The instance managers 53 may be a virtual machine monitor (VMM) or another type of program configured to enable the execution of virtual machine instances 58 on server 56, for example. As discussed above, each of the virtual machine instances 58 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 55 shown in FIG. 5, a router 51 may be utilized to interconnect the servers 56a and 56b. Router 51 may also be connected to gateway 54, which is connected to network 105. Router 51 may be connected to one or more load balancers, and alone or in combination may manage communications within networks in data center 55, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 55 shown in FIG. 5, a data center 55 is also employed to at least in part direct various communications to, from and/or between servers 56a and 56b. While FIG. 5 depicts router 51 positioned between gateway 54 and data center 55, this is merely an exemplary configuration. In some cases, for example, data center 55 may be positioned between gateway 54 and router 51. Data center 55 may, in some cases, examine portions of incoming communications from user computers 52 to determine one or more appropriate servers 56 to receive and/or process the incoming communications. Data center 55 may determine appropriate servers to receive and/or process the incoming communications based on factors such as an identity, location or other attributes associated with user computers 52, a nature of a task with which the communications are associated, a priority of a task with which the communications are associated, a duration of a task with which the communications are associated, a size and/or estimated resource usage of a task with which the communications are associated and many other factors. Data center 55 may, for example, collect or otherwise have access to state information and other information associated with various tasks in order to, for example, assist in managing communications and other operations associated with such tasks.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 55 described in FIG. 5 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   determining a first spanning tree instance of an Ethernet network, wherein the first spanning tree instance employs spanning tree protocol;
   determining a first device of the first spanning tree instance, wherein the first device comprises at least a first port and a second port;
   determining that the spanning tree protocol assigns a forwarding state to the first port;
   determining that a correct application of the spanning tree protocol assigns a blocking state to the second port;
   determining, using a monitoring process, that the second port is forwarding network traffic;
   disabling, by the monitoring process, a network link connected to the second port; and
   generating first output data indicating that an unstable network condition occurred.

2. The method of claim 1, wherein the monitoring process disables the network link at Layer-1 of an Open Systems Interconnection (OSI) model by removing power from the network link.

3. The method of claim 1, further comprising determining, by the monitoring process, that the second port is forwarding network traffic by determining a spanning tree protocol state reported for the second port.

4. The method of claim 1, further comprising:
   determining a counter state of a traffic monitor that monitors the network link connected to the second port; and
   determining, by the monitoring process, that the counter state indicates that the second port is forwarding network traffic.

5. A method comprising:
   determining a first set of networked devices employing a loop-prevention protocol;
   identifying a first device of the first set of networked devices, the first device comprising at least a first port and a second port;
   determining that the loop-prevention protocol has assigned a forwarding state to the first port;
   determining that an application of the loop-prevention protocol assigns a non-forwarding state to the second port;
   determining that the second port forwards network traffic; and
   disabling a network link associated with the second port.

6. The method of claim 5, further comprising disabling the network link associated with the second port by removing power from the network link.

7. The method of claim 5, further comprising determining, by a monitoring process, that the second port is forwarding network traffic by determining a loop-prevention protocol state reported for the second port.

8. The method of claim 5, further comprising:
   determining a counter state of a traffic monitor that monitors the network link associated with the second port; and
   determining that the counter state indicates that the second port is forwarding network traffic.

9. The method of claim 5, wherein the loop-prevention protocol assigns a blocking state to the second port, the method further comprising:
   determining a hardware parity error, wherein the second port forwards network traffic based at least in part on the hardware parity error.

10. The method of claim 5, further comprising monitoring the first set of networked devices using a management port that is out-of-band with respect to a network on which the first set of networked devices communicate.

11. The method of claim 5, further comprising:
    iterating through a plurality of spanning tree instances; and
    for each of the plurality of spanning tree instances, checking each device of the corresponding spanning tree instance for more than one forwarding port.

12. The method of claim 5, further comprising:
    receiving first data indicating that two or more ports on a single device are in a forwarding state; and
    in response to the first data, disabling a network link associated with one of the two or more ports.

13. A system comprising:
    at least one processor; and
    non-transitory computer-readable memory storing instructions that, when executed by the at least one processor, are effective to:
    determine a first set of networked devices employing a loop-prevention protocol;
    identify a first device of the first set of networked devices, the first device comprising at least a first port and a second port;
    determine that the loop-prevention protocol has assigned a forwarding state to the first port;
    determine that an application of the loop-prevention protocol assigns a non-forwarding state to the second port;
    determine that the second port forwards network traffic; and
    disable a network link associated with the second port.

14. The system of claim 13, the non-transitory computer-readable memory storing further instructions that, when executed by the at least one processor, are further effective to disable the network link associated with the second port by removing power from the network link.

15. The system of claim 13, the non-transitory computer-readable memory storing further instructions that, when executed by the at least one processor, are further effective to determine, by a monitoring process, that the second port is forwarding network traffic by determining a loop-prevention protocol state reported for the second port.

16. The system of claim 13, the non-transitory computer-readable memory storing further instructions that, when executed by the at least one processor, are further effective to:
    determine a counter state of a traffic monitor that monitors the network link associated with the second port; and
    determine that the counter state indicates that the second port is forwarding network traffic.

17. The system of claim 13, wherein:
    the loop-prevention protocol assigns a blocking state to the second port; and
    a hardware parity error results in the second port forwarding network traffic.

18. The system of claim 13, the non-transitory computer-readable memory storing further instructions that, when executed by the at least one processor, are further effective to monitor the first set of networked devices using a management port that is out-of-band with respect to a network on which the first set of networked devices communicate.

19. The system of claim 13, the non-transitory computer-readable memory storing further instructions that, when executed by the at least one processor, are further effective to:
    iterate through a plurality of spanning tree instances; and
    for each of the plurality of spanning tree instances, check each device of the corresponding spanning tree instance for more than one forwarding port.

20. The system of claim 13, the non-transitory computer-readable memory storing further instructions that, when executed by the at least one processor, are further effective to:
    receive first data indicating that two or more ports on a single device are in a forwarding state; and
    in response to the first data, disable a network link associated with one of the two or more ports.

* * * * *